US010417578B2

(12) United States Patent
Jat et al.

(10) Patent No.: US 10,417,578 B2
(45) Date of Patent: Sep. 17, 2019

(54) METHOD AND SYSTEM FOR PREDICTING REQUIREMENTS OF A USER FOR RESOURCES OVER A COMPUTER NETWORK

(71) Applicant: Conduent Business Services, LLC, Dallas, TX (US)

(72) Inventors: Sharmistha Jat, Pune (IN); Anuj Mahajan, Indore (IN); Shourya Roy, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 675 days.

(21) Appl. No.: 14/864,977

(22) Filed: Sep. 25, 2015

(65) Prior Publication Data

US 2017/0091653 A1  Mar. 30, 2017

(51) Int. Cl.
*G06N 20/00* (2019.01)
*H04L 12/58* (2006.01)
(Continued)

(52) U.S. Cl.
CPC ....... *G06N 20/00* (2019.01); *G06F 16/24578* (2019.01); *G06F 16/285* (2019.01);
(Continued)

(58) Field of Classification Search
CPC ................. G06N 99/005; G06N 20/00; G06F 17/13598; G06F 16/24578; G06F 16/285;
(Continued)

(56) References Cited

U.S. PATENT DOCUMENTS 6,070,133 A    5/2000 Brewster et al.
6,505,202 B1 * 1/2003 Mosquera ........... G06F 17/3053
(Continued)

OTHER PUBLICATIONS

Zhengzheng Xing, Jian Pei, and Eamonn Keogh. A brief survey on sequence classication. SIGKDD Explor. Newsl., 12(1):40{48, Nov. 2010.
(Continued)

*Primary Examiner* — Kamran Afshar
*Assistant Examiner* — Brent Johnston Hoover
(74) *Attorney, Agent, or Firm* — Jones Robb, PLLC

(57) ABSTRACT

The disclosed embodiments illustrate methods and systems for predicting requirements of a user for resources. The method includes transforming a message posted by the user into a first message vector. The method further includes categorizing one or more first message vectors into one or more categories. The method further includes transforming each of the categorized first message vectors into one or more second message vectors using a wavelet transform technique. The method further includes determining, for each of the categorized first message vectors, a first score based on at least a probability distribution of one or more coefficients associated with each associated feature. The method further includes selecting a predefined number of features based on at least the first score. The method further includes training one or more classifiers on the selected predefined number of features to identify at least the one or more needs of the user.

14 Claims, 5 Drawing Sheets

(51) Int. Cl.
*H04L 29/08* (2006.01)
*G06F 16/28* (2019.01)
*G06F 16/2457* (2019.01)
*G06N 7/00* (2006.01)

(52) U.S. Cl.
CPC ............. *G06N 7/005* (2013.01); *H04L 51/32* (2013.01); *H04L 67/02* (2013.01)

(58) Field of Classification Search
CPC .......... G06F 17/3053; G06F 17/30598; G06Q 30/025; G06Q 50/01; H04L 151/32; H04L 67/02; H04L 51/32; A61K 39/12; A61K 39/275; A61K 47/10; A61K 47/18; A61K 47/183; A61K 47/26; A61K 9/0019; A61K 9/08; C12N 2710/24034; Y02A 50/412

See application file for complete search history.

(56) References Cited

U.S. PATENT DOCUMENTS

| | | | |
|---|---|---|---|
| 8,873,813 B2 | 10/2014 | Tadayon et al. | |
| 8,938,450 B2* | 1/2015 | Spivack | G06F 17/275 707/723 |
| 9,818,142 B2* | 11/2017 | Wang | G06Q 30/0625 |
| 9,875,504 B1* | 1/2018 | Roe | G06Q 30/0643 |
| 2006/0111644 A1* | 5/2006 | Guttag | A61B 5/048 600/544 |
| 2013/0041748 A1* | 2/2013 | Hsiao | G06Q 30/02 705/14.41 |
| 2013/0332450 A1* | 12/2013 | Castelli | G06F 17/278 707/722 |
| 2014/0297476 A1* | 10/2014 | Wang | G06Q 30/0625 705/26.62 |
| 2016/0055541 A1* | 2/2016 | Calistri-Yeh | G06Q 30/0269 705/14.66 |
| 2016/0275372 A1* | 9/2016 | Goodwin | G06K 9/6267 |
| 2017/0061966 A1* | 3/2017 | Marcheret | G10L 15/25 |

OTHER PUBLICATIONS

Hammad Qureshi, Olcay Sertel, Nasir Rajpoot, Roland Wilson, and Metin Gurcan. Adaptive discriminant wavelet packet transform and local binary patterns for meningioma subtype classi_cation. In Dimitris N. Metaxas, Leon Axel, Gabor Fichtinger, and Gbor Szkely, editors, MICCAI (2), vol. 5242 of Lecture Notes in Computer Science, pp. 196{204. Springer, 2008.

Bo Han, Paul Cook, and Timothy Baldwin. Automatically constructing a normalisation dictionary for microblogs. In Proceedings of the 2012 Joint Conference on Empirical Methods in Natural Language Processing and Computational Natural Language Learning, pp. 421{432, Jeju Island, Korea, Jul. 2012. Association for Computational Linguistics.

NM Rajpoot. Local discriminant wavelet packet basis for texture classi_cation. In SPIE Wavelets X, pp. 774{783. SPIE, 2003.

RonaldR. Coifman, Yves Meyer, Steven Quake, and M.Victor Wickerhauser. Signal processing and compression with wavelet packets. In J.S. Byrnes, JenniferL. Byrnes, KathrynA. Hargreaves, and Karl Berry, editors, Wavelets and Their Applications, vol. 442 of NATO ASI Series, pp. 363{379. Springer Netherlands, 1994.

R. R. Coifman and M. V. Wickerhauser. Entropy-based algorithms for best basis selection. IEEE Trans. Inf. Theor., 38(2):713{718, Sep. 2006.

* cited by examiner

METHOD AND SYSTEM FOR PREDICTING REQUIREMENTS OF A USER FOR RESOURCES OVER A COMPUTER NETWORK

TECHNICAL FIELD

The presently disclosed embodiments are related, in general, to a data mining. More particularly, the presently disclosed embodiments are related to methods and systems for predicting requirements of a user for one or more resources over a computer network based on messages of the user extracted from social media platforms.

BACKGROUND

With ever-increasing advancements and popularity of social media platforms such as FACEBOOK, LINKEDIN, TWITTER™, and/or the like, users generally look up to the social media platforms to post and/or share messages that reflect their likes, dislikes, and needs. Further, individuals and/or organizations are increasingly extracting and analyzing such messages posted by the users on the social media platforms.

However, as the number of messages posted and/or shared by one or more users on the social media platforms is very high (due to a large number of users registered on the social media platforms), identifying one or more needs of the one or more users may be a time-consuming and complicated task.

SUMMARY

According to embodiments illustrated herein, there is provided a method for predicting requirements of a user for one or more resources over a computer network. The method includes transforming, by one or more processors, each message, from one or more messages posted by the user on one or more social media websites, into a first message vector based on at least a comparison with a dictionary. The method further includes categorizing, by the one or more processors, each of one or more first message vectors into one or more categories based on a predetermined class label associated with respective message. The method further includes transforming, for each categorized first message vector in a category from the one or more categories by the one or more processors, the categorized first message vector into one or more second message vectors using a wavelet transform technique, wherein each of the one or more second message vectors has at least one or more associated features, and wherein each of the one or more associated features is represented by one or more coefficients. The method further includes determining, for each categorized first message vector in the category from the one or more categories by the one or more processors, a probability distribution of each of the one or more coefficients. The method further includes determining, for each categorized first message vector in the category from the one or more categories by the one or more processors, a first score, for each associated feature, based on at least the probability distribution of each of the one or more coefficients associated with each associated feature. The method further includes selecting, for each categorized first message vector in the category from the one or more categories by the one or more processors, a predefined number of features, from the one or more associated features, based on at least the first score. The method further includes training, by the one or more processors, one or more classifiers on the selected predefined number of features, wherein the one or more classifiers predict requirements of the user for the one or more resources.

According to embodiments illustrated herein, there is provided a system for predicting requirements of a user for one or more resources over a computer network. The system includes one or more processors configured to transform each message, from one or more messages posted by the user on one or more social media websites, into a first message vector based on at least a comparison with a dictionary. The one or more processors are further configured to categorize each of one or more first message vectors into one or more categories based on a predetermined class label associated with respective message. The one or more processors are further configured to transform, for each categorized first message vector in a category from the one or more categories, the categorized first message vector into one or more second message vectors using a wavelet transform technique, wherein each of the one or more second message vectors has at least one or more associated features, and wherein each of the one or more associated features is represented by one or more coefficients. The one or more processors are further configured to determine, for each categorized first message vector in a category from the one or more categories, a probability distribution of each of the one or more coefficients. The one or more processors are further configured to determine, for each categorized first message vector in a category from the one or more categories, a first score, for each associated feature, based on at least the probability distribution of each of the one or more coefficients associated with each associated feature. The one or more processors are further configured to select, for each categorized first message vector in a category from the one or more categories, a predefined number of features, from the one or more associated features, based on at least the first score. The one or more processors are further configured to train one or more classifiers on the selected predefined number of features, wherein the one or more classifiers predict requirements of the user for the one or more resources.

According to embodiments illustrated herein, there is provided a computer program product for use with a computing device. The computer program product comprises a non-transitory computer readable medium storing a computer program code for predicting requirements of a user for one or more resources over a computer network. The computer program code is executable by one or more processors in the computing device to transform each message, from one or more messages posted by the user on one or more social media websites, into a first message vector based on at least a comparison with a dictionary. The computer program code is further executable by the one or more processors to categorize each of one or more first message vectors into one or more categories based on a predetermined class label associated with respective message. The computer program code is further executable by the one or more processors to determine a count of first vehicles, for plying along the route at the time instance, based on at least the set of constraints. The computer program code is further executable by the one or more processors to transform, for each categorized first message vector in a category from the one or more categories, the categorized first message vector into one or more second message vectors using a wavelet transform technique, wherein each of the one or more second message vectors has at least one or more associated features, and wherein each of the one or more associated features is represented by one or more coefficients. The computer program code is further executable by the one or more processors to determine, for each categorized first message vector in a category from the one or more categories, a probability distribution of each of the one or more coefficients. The computer program code is further executable by the one or more processors to determine, for each categorized first message vector in a category from the one or more categories, a first score, for each associated feature, based on at least the probability distribution of each of the one or more coefficients associated with each associated feature. The computer program code is further executable by the one or more processors to select, for each categorized first message vector in a category from the one or more categories, a predefined number of features, from the one or more associated features, based on at least the first score. The computer program code is further executable by the one or more processors to train one or more classifiers on the selected predefined number of features, wherein the one or more classifiers predicting requirements of the user for the one or more resources.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
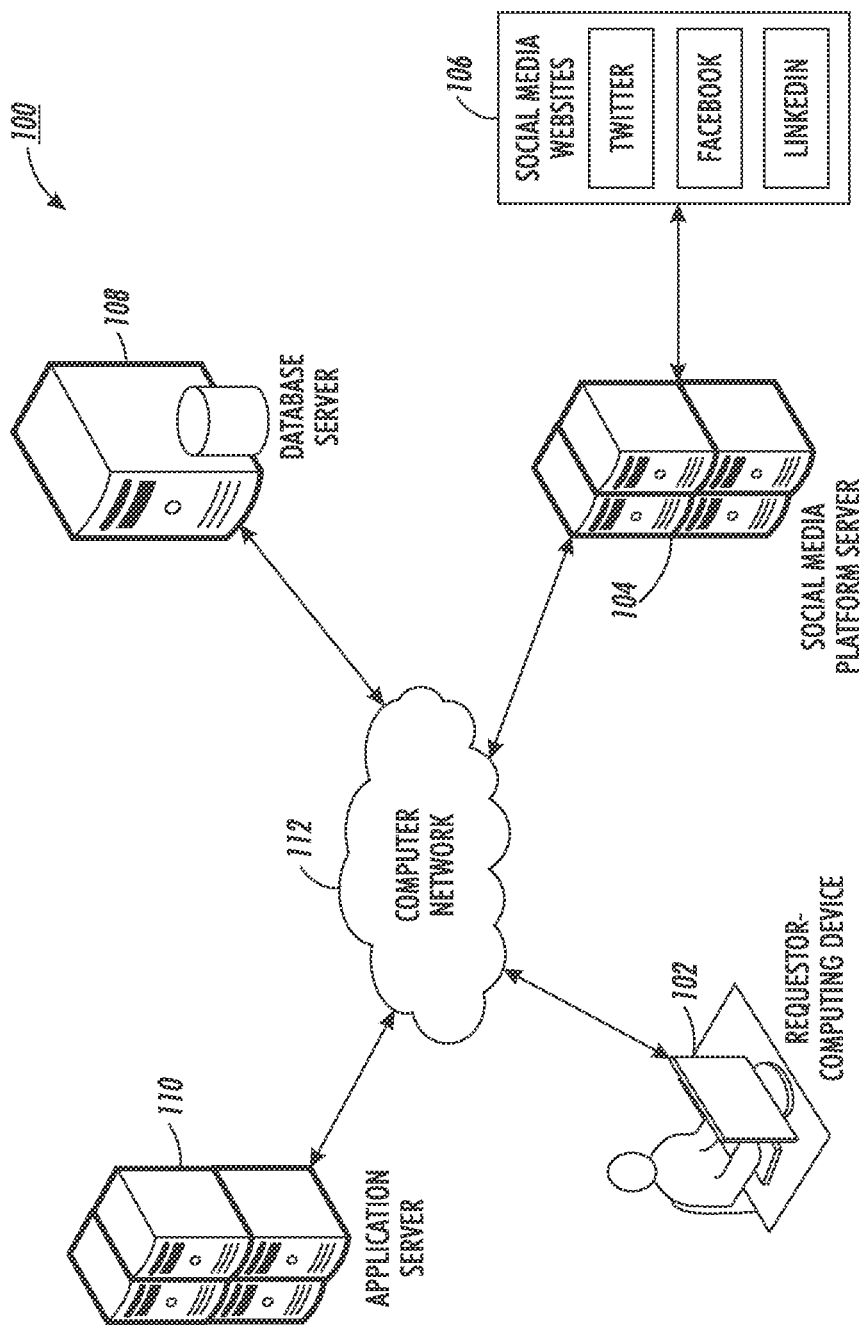
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes one or more processors/microcontrollers and/or any other electronic components, a device, or a system that performs one or more operations according to one or more programming instructions/codes. Examples of the computing device may include, but are not limited to, a desktop computer, a laptop, a PDA, a mobile device, a smartphone, a tablet computer (e.g., iPad® and Samsung Galaxy Tab®), and the like.

A "social media platform" refers to a communication platform through which a user may interact with one or more other users who are known to or otherwise acquainted with the user. Further, apart from interacting with one another, the user and the one or more other users may perform one or more actions on the social media platform. In an embodiment, the one or more actions may include, but are not limited to, posting content or sharing content with the other users and liking or disliking content posted/shared by the other users. Examples of the social media platforms may include, but are not limited to, social networking websites (e.g., FACEBOOK, TWITTER™, LINKEDIN, GOOGLE+™, and/or the like), web-blogs, web-forums, community portals, online communities, or online interest groups. In an embodiment, the social media platform may be utilized to maximize the spread of content. Hereinafter, the term "social media platform" may be interchangeably referred as "social network platform" or "social networking platform".

"Social media data" refers to a historical data of a user, who is associated with a social media website such as FACEBOOK. The social media data may include at least a user profile of the user and one or more messages posted, shared, liked, or disliked by the user on a social media website.

A "user" refers to an individual who may be registered on one or more social media platforms. The user may interact with one or more other users of the one or more social media platforms who are known to or otherwise acquainted with him/her, by performing one or more actions. For example, a user may share a content with one or more other users. The content may include one or more of, but is not limited to, a text message, an image, and a video.

"One or more needs" refer to one or more requisites or essentials for one or more products or services that may be required by a user. Hereinafter, "one or more needs" and "one or more requirements" may be interchangeably used.

A "requestor" refers to an individual, an advertiser, a sales person, or an artificial entity such as an organization, a business group, or a franchise. In an embodiment, the requestor may be interested in identifying/knowing/predicting one or more needs of a user. Further, in an embodiment, after identifying the one or more needs of the user, the requestor may suggest or propose the user with one or more products or services associated with the one or more needs of the user. In another embodiment, the requestor may be interested in identifying one or more users, who may align or may be interested in the one or more products or services provided by the requestor.

A "message" refers to a written or recorded communication that may have been shared or posted by a user on a social medial platform. In an embodiment, the user may have liked or disliked the message posted or shared by one or more other users on the social media platform. The message may include one or more of, but are not limited to, a text message, an audio voice, a recorded message, a video, and/or the like.

A "dictionary" refers to an electronic repository of a plurality of words that may contain information pertaining to each of the plurality of words. In an embodiment, the information pertaining to a word may include one or more of, but are not limited to, a meaning of the word, a synonym of the word, an acronym of the word, an origin of the word, a usage of the word, and an equivalent meaning of the word in one or more different languages. Further, in an embodiment, the information may include a class label of each of the plurality of words. The class label may include one or more of, but are not limited to, a health domain, a finance domain, an education domain, and a job domain.

A "data structure" refers to a collection of data stored in a memory. In an embodiment, various operations may be performed to manipulate the data structures. Some examples of data structures may include, but are not limited to, a matrix, an array, a record, a hash table, a union, a graph, and a linked list.

A "first message vector" refers to a data structure of a message. In an embodiment, the first message vector may correspond to a binary representation of the message. The first message vector may be determined based on at least a comparison of one or more words in the message with a dictionary. For example, a word in a message may correspond to "1" in a first message vector if the word is present in a dictionary. Similarly, a word in a message may correspond to "0" in a first message vector if the word is not present in a dictionary.

A "second message vector" refers to a data structure that may be obtained based on at least a transformation of a first message vector using a wavelet transformation technique. In an embodiment, the second message vector may include one or more features that are represented by one or more coefficients.

"Probability" shall be broadly construed, to include any calculation of probability; approximation of probability, using any type of input data, regardless of precision or lack of precision; any number, either calculated or predetermined, which simulates a probability; or any method step having an effect of using or finding some data having some relation to a probability.

A "random variable" refers to a variable that may be assigned a value probabilistically or stochastically.

A "probability distribution" refers to an assignment of probability to each measurable subset of possible outcomes of a random variable. In an embodiment, the probability distribution may correspond to a distribution of the random variable whose integral over any interval is the probability that the variate specified by it will lie within that interval.

A "probability density function" of a random variable refers to a function that may describe a relative likelihood for this random variable to take on a given value.

"Noisy data" refers to a message from one or more messages or a word from the message that may not be related to a task under consideration. For example, a set of messages (or a set of words in a message) that are related to sports may not be useful if the task is to determine a user's need for saving accounts. In such a case, the set of messages (or the set of words in the message) may be referred to as a noisy data.

"Tokenization" is a process of segmenting one or more written content into one or more words, one or more phrases, one or more symbols, or other meaningful elements.

"Stemming" is a process of transforming a word to a root form. Stemming may transform each of one or more words associated with one or more messages to their stem forms. For example, if the one or more words include words such as "finding", "find", and "finds", each of the one or more words is transformed to their respective root forms "find".

A "classifier" refers to a mathematical model that may be configured to categorize one or more users into one or more categories based on identified one or more needs of the respective the one or more users. In an embodiment, the classifier may be trained based at least content posted, shared, liked or disliked by the user on a social media platform. Examples of the classifier may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier.

"Training" refers to a process of updating/tuning a classifier using at least a historical data such that the classifier may be able to predict at least one category, among one or more categories, in which a user may be categorized. The one or more categories may correspond to one or more needs or requirements.

FIG. 1 is a block diagram of a system environment 100 in which various embodiments may be implemented. The system environment 100 includes a requestor-computing device 102, a social media platform server 104, a database server 108, an application server 110, and a computer network 112. Further, the social media platform server 104 may be communicatively coupled with one or more social media websites, such as social media websites 106. Various devices in the system environment 100 may be interconnected over the computer network 112. FIG. 1 shows, for simplicity, one requestor-computing device 102, one social media platform server 104, one database server 108, and one application server 110. However, it will be apparent to a person having ordinary skill in the art that the disclosed embodiments may also be implemented using multiple requestor-computing devices, multiple social media platform servers, multiple database servers, and multiple application servers, without departing from the scope of the disclosure.

The requestor-computing device 102 refers to a computing device used by a requestor. The requestor may correspond to an individual, a sales person, or an artificial entity such as an organization or a franchise, who/which may be interested in predicting/identifying one or more requirements of a user for one or more resources. The one or more resources may correspond to one or more products, one or more services, one or more solutions, and/or the like. In an embodiment, the requestor-computing device 102 may comprise one or more processors in communication with one or more memories. The requestor-computing device 102 may be operable to execute one or more sets of instructions stored in the one or more memories. In an embodiment, the requestor-computing device 102 may be communicatively coupled to the computer network 112. In an embodiment, the requestor-computing device 102 may comprise a display screen that may be configured to display one or more user interfaces to the requestor.

In an embodiment, the requestor may utilize the requestor-computing device 102 to transmit or receive information, pertaining to an identification/prediction of the one or more requirements/needs of one or more users, to/from the database server 108 and/or the application server 110 over the computer network 112. For example, a requestor may input, using the requestor-computing device 102, a first numerical value representing a number of users that are to be identified from one or more social media platforms in a given domain of interest. The domain of interest may correspond to one or more of, but are not limited to, a health domain, an education domain, a finance domain, and/or the like. In an embodiment, the requestor may input a second numerical value depicting a predefined level L. The predefined level L corresponds to a numerical value that may be utilized to determine a count of one or more second vectors. The one or more second message vectors are obtained by applying a wavelet packet transformation technique on a first message vector. The determination of the first message vector and the one or more second message vector has explained later in conjunction with FIG. 2 and FIG. 3. In an embodiment, the requestor-computing device 102 may transmit the first numerical value and the second numerical value to the database server 108 or the application server 110. Further, in an embodiment, the requestor may be presented with a user interface on the display screen of the requestor-computing device 102 displaying the one or more needs of the one or more users.

After identifying the one or more requirements of the one or more users, the requestor may utilize the requestor-computing device 102 to communicate with the one or more users over the computer network 112. Further, the requestor may recommend one or more products or services associated with the one or more needs of the one or more users.

The requestor-computing device 102 may correspond to various types of computing devices such as, but not limited to, a desktop computer, a laptop, a PDA, a mobile device, a smartphone, a tablet computer (e.g., iPad® and Samsung Galaxy Tab®), and/or the like.

The social media platform server 104 may be configured to host one or more social network platforms such as, but not limited to, social media websites 106 (e.g., FACEBOOK, TWITTER™, LINKEDIN, GOOGLE+™, and so forth), a chat/messaging application, a web-blog, a web-forum, a community portal, an online community, or an online interest group. In an embodiment, the one or more users may be registered on the one or more social network platforms. The social media platform server 104 may refer to a communication medium through which a user may interact with the one or more other users. Further, apart from interacting with one another, the user and the one or more other users may post one or more messages on the social network platforms. Further, in an embodiment, each of the one or more users may share/tag the one or more messages with the one or more other users on the social network platforms. Further, the one or more users may interact with one another in reference to the one or more messages. In an embodiment, the one or more messages shared or posted by the user may be indicative of the one or more needs, requirements, likes, or dislikes of the user for the one or more resources. The one or more resources may include one or more products, one or more services, and/or the like.

In an embodiment, the social media platform server 104 may be realized through various web-based technologies such as, but are not limited to, a Java web-framework, a .NET framework, a PHP framework, or any other web-application framework.

The database server 108 may refer to a computing device that may store social media data pertaining to the one or more users of the social network platforms such as FACEBOOK, LINKEDIN, TWITTER™, and the like, in accordance with at least one embodiment. The social media data pertaining to the one or more users may comprise one or more of, but not limited to, one or more attributes of user profiles associated with the one or more users and the one or more messages posted, shared, liked, or disliked by the one or more users. The one or more attributes pertaining to the user profiles may comprise at least one or more of, but are not limited to, a name, occupational details, biographical keywords, likes/dislikes, hobbies, and personal descriptions of the one or more user. In an embodiment, the database server 108 may be configured to extract the social media data of the one or more users from the social media platform server 104. The extracted social media data may be associated with a predefined time duration. For example, each of the one or more messages extracted from the social media platform server 104 may have an associated timestamp. For example, a requestor may specify to extract social media data of x users for a predefined time period such as the last six months.

In an embodiment, the database server 108 may be communicatively coupled to the computer network 112. In an embodiment, the database server 108 may be configured to transmit or receive one or more instructions/information/social media data to/from one or more devices, such as the requestor-computing device 102, the social media platform server 104, or the application server 110 over the computer network 112. In an embodiment, the database server 108 may receive a query from the requestor-computing device 102 or the application server 110 to retrieve the social media data pertaining to the one or more users. For querying the database server 108, one or more querying languages may be utilized such as, but not limited to, SQL, QUEL, DMX and so forth. Further, the database server 108 may be realized through various technologies such as, but not limited to, Microsoft® SQL server, Oracle, and My SQL.

A person having ordinary skill in the art will understand that the scope of the disclosure is not limited to the social media platform server 104 or the database server 108 as a separate entity. In an embodiment, the functionalities of the social media platform server 104 may be integrated into the database server 108, or vice-versa without departing from the spirit of the disclosure.

The application server 110 refers to a computing device that may include one or more processors and one or more memories. The one or more memories may include computer readable code that may be executable by the one or more processors to perform one or more operations. For example, the one or more operations may include one or more of, but are not limited to, transforming the one or more messages posted by the user into one or more first message vectors, categorizing the one or more first message vectors into one or more categories, and determining one or more second message vectors using a wavelet packet transformation technique. The one or more operations may further include determining a probability distribution of each of one or more coefficients of one or more features associated with each of the one or more second message vectors, selecting a predefined number of features based on the probability distribution, and training one or more classifiers to determine the one or more requirements of the user for the one or more resources. The one or more resources may correspond to one or more products, one or more services, and/or the like, associated with the one or more domains of interest (e.g., health domain, finance domains, etc.).

Prior to performing the one or more operations, the application server 110 may receive the input from the requestor-computing device 102. For example, the input may correspond to the identification/prediction of the one or more needs of the one or more users in the domain such as the health domain or the finance domain. Thereafter, the application server 110 may connect to the database server 108, to extract the social media data of the one or more users for a predefined time period, using one or more protocols such as, but not limited to, Open Database Connectivity (ODBC) protocol and Java Database Connectivity (JDBC) protocol. In an alternate embodiment, the application server 110 may directly extract the social media data from the social media platform server 104.

The application server 110 may be realized through various types of application servers such as, but not limited to, a Java application server, a .NET framework application server, and a Base4 application server.

A person having ordinary skill in the art will understand that the scope of the disclosure is not limited to the database server 108 or the application server 110 as a separate entity. In an embodiment, the functionalities of the database server 108 may be integrated into the application server 110 without departing from the spirit of the disclosure.

Further, a person skilled in the art will appreciate that the scope of the disclosure should not be limited to the requestor-computing device 102 and the application server 110 as separate entities. In an embodiment, the application server 110 may be realized as an application hosted on or running on the requestor-computing device 102 without departing from the spirit of the disclosure.

The computer network 112 may include a medium through which devices, such as the requestor-computing device 102 and one or more servers, such as the social media platform server 104, the database server 108, and the application server 110 may communicate with each other. Examples of the computer network 112 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the computer network 112, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

Figure 2:
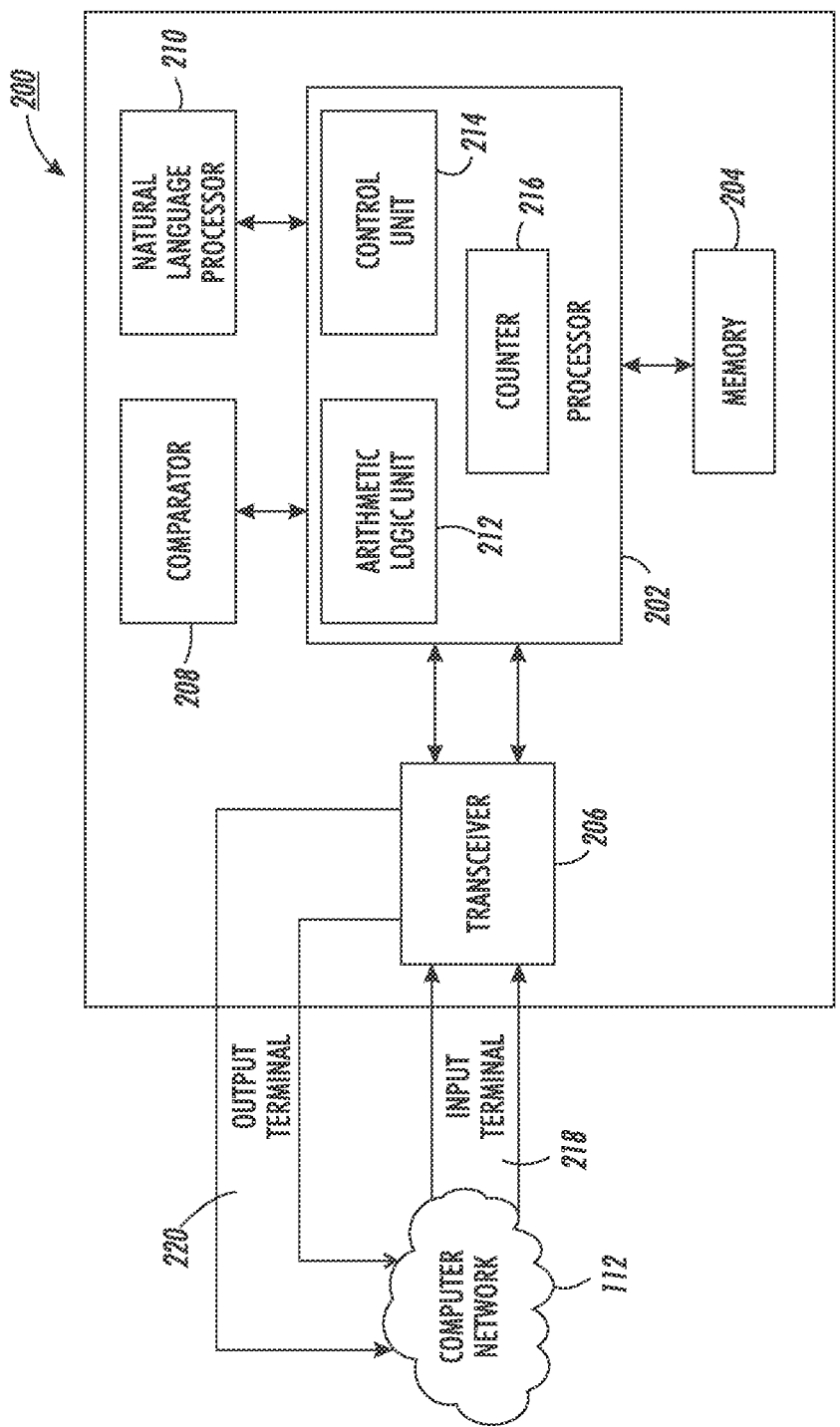
FIG. 2 is a block diagram that illustrates a system for predicting requirements of a user for one or more resources over a computer network, in accordance with at least one embodiment.

FIG. 2 is a block diagram that illustrates a system 200 for predicting requirements of a user for one or more resources, in accordance with at least one embodiment. In an embodiment, the system 200 may correspond to the requestor-computing device 102 or the application server 110. For the purpose of ongoing description, the system 200 is considered as the application server 110. However, the scope of the disclosure should not be limited to the system 200 as the application server 110. The system 200 may also be realized as the requestor-computing device 102, without departing from the spirit of the disclosure.

The system 200 may include one or more processors, such as a processor 202, one or more memories, such as a memory 204, one or more transceivers, such as a transceiver 206, one or more comparators, such as a comparator 208, and one or more natural language processors, such as a natural language processor (NLP) 210. The transceiver 206 may be coupled with an input terminal 218 and an output terminal 220. The transceiver 206 may be connected to the computer network 112 through the input terminal 218 and the output terminal 220.

The processor 202 may be configured to execute one or more sets of instructions stored in the memory 204. The processor 202 may be coupled to the memory 204, the transceiver 206, and the comparator 208. The processor 202 may further comprise an arithmetic logic unit (ALU) 212 and a control unit 214. The ALU 212 may be coupled to the control unit 214. The ALU 212 may be configured to perform one or more mathematical and logical operations and the control unit 214 may be operable to control the operation of the ALU 212. Further, the processor 202 may comprise one or more counters such as a counter 216. Though, the counter 216 is implemented within the processor 202 in FIG. 2, a person skilled in the art will appreciate the counter 216 to be implemented as independent from the processor 202 without departing from the scope of the disclosure. The processor 202 may execute a set of instructions/programs/codes/scripts stored in the memory 204 to perform the one or more operations. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may comprise suitable logic, circuitry, and/or interfaces that may be operable to store one or more machine codes, and/or computer programs having at least one code section executable by the processor 202. The memory 204 may store the one or more sets of instructions. In an embodiment, the memory 204 may include one or more buffers (not shown). The one or more buffers may store at least one or more of, but not limited to, the one or more attributes of the one or more users and the one or more messages posted, shared, liked, or disliked by the one or more users. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform the one or more operations. It will be apparent to a person having ordinary skill in the art that the one or more instructions stored in the memory 204 may enable the hardware of the system 200 to perform the one or more operations.

The transceiver 206 may comprise suitable logic, circuitry, and/or interfaces that may be operable to communicate with the one or more devices, such as the requestor-computing device 102, and/or one or more servers, such as the social media platform server 104 or the database server 108 over the computer network 112. The transceiver 206 may be operable to transmit or receive the instructions, queries, social media data, or other information to/from various components of the system environment 100. In an embodiment, the transceiver 206 is coupled to the input terminal 218 and the output terminal 220 through which the transceiver 206 may receive or transmit the instructions, queries, social media data or other information corresponding to the identification of the one or more needs of the user. In an embodiment, the input terminal 218 and the output terminal 220 may be realized through, but are not limited to, an antenna, an Ethernet port, an USB port or any other port that can be configured to receive and transmit data. The transceiver 206 may receive and transmit various data in accordance with various communication protocols such as, TCP/IP, UDP, and 2G, 3G, or 4G communication protocols through the input terminal 218 and the output terminal 220, respectively.

The comparator 208 may comprise suitable logic, circuitry, and/or interfaces that may be configured to compare at least two input signals to generate an output signal. In an embodiment, the output signal may correspond to either "1" or "0." In an embodiment, the comparator 208 may generate output "1" if the value of a first signal (from the at least two signals) is greater than the value of a second signal (from the at least two signals). Similarly, the comparator 208 may generate an output "0" if the value of the first signal is less than the value of the second signal. In an embodiment, the comparator 208 may be realized through either software technologies or hardware technologies known in the art. Though, the comparator 208 is depicted as independent from the processor 202 in FIG. 2, a person skilled in the art will appreciate that the comparator 208 may be implemented within the processor 202 without departing from the scope of the disclosure.

The NLP 210 is a processor configured to analyze the social media data (e.g., one or more messages or textual content within or extracted from a multimedia content) to draw meaningful conclusions therefrom. In an embodiment, the NLP 210 may employ one or more natural language processing techniques and one or more machine learning techniques known in the art to perform the analysis of the social media data. Examples of such techniques include, but are not limited to, Naïve Bayes classification, artificial neural networks, Support Vector Machines (SVM), multinomial logistic regression, or Gaussian Mixture Model (GMM) with Maximum Likelihood Estimation (MLE).

In an embodiment, the NLP 210 may be configured to pre-process the one or more messages associated with the user. The pre-processing may comprise at least one of a tokenization, a stemming, or a normalization of the one or more messages. Though the NLP 210 is depicted as separate from the processor 202 in FIG. 2, a person skilled in the art will appreciate that the functionalities of the NLP 210 may be implemented within the processor 202 without departing from the scope of the disclosure. Further, a person skilled in the art will understand that the scope of the disclosure is not limited to realizing the NLP 210 as a hardware component. In an embodiment, the NLP 210 may be implemented as a software module included in a computer program code (stored in the memory 204), which may be executable by the processor 202 to perform the functionalities of the NLP 210.

Figure 3:
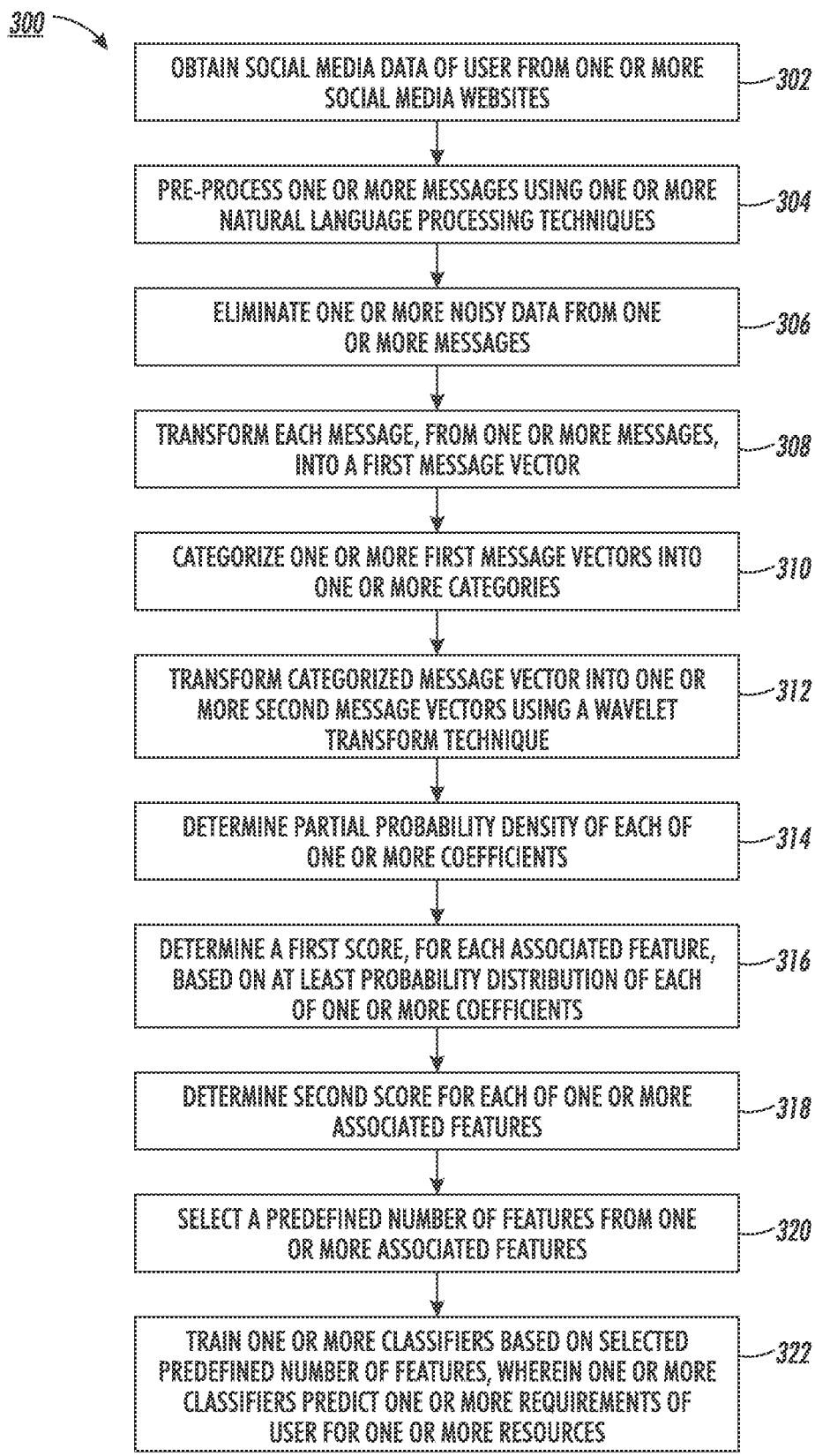
FIG. 3 is a flowchart illustrating a method for predicting requirements of a user for one or more resources over a computer network, in accordance with at least one embodiment.

An embodiment of the operation of the system 200 for identifying/predicting the one or more requirements of the user over the computer network 112 has been explained further in conjunction with FIG. 3.

FIG. 3 is a flowchart illustrating a method for predicting one or more requirements of a user for one or more resources, in accordance with at least one embodiment. The flowchart 300 has been described in conjunction with elements of FIG. 1 and FIG. 2.

At step 302, the social media data of the user is obtained from the one or more social network platforms such as the social media websites 106. The social media websites 106 may include one or more of, but are not limited to, FACEBOOK, TWITTER™, LINKEDIN, GOOGLE+™, and the like. In an embodiment, the processor 202 may be configured to obtain the social media data of the user from the one or more social network platforms. In another embodiment, the processor 202 may be configured to obtain the social media data of the user from the database server 108. In an embodiment, the social media data may include the one or more attributes of the user and the one or more messages posted, shared, liked, or disliked by the user on the social network platforms. For example, one or more attributes of a user may include a name, an occupational details, a biographical keywords, likes/dislikes, hobbies and the like. In an embodiment, the one or more messages may include one or more written content or one or more recorded content. For example, one or more written content may include one or more text messages. Further, one or more recorded content may include one or more audios or videos. Further, the one or more messages may include one or more images. In an embodiment, the processor 202 may store the one or more messages in the memory 204.

Prior to extracting the social media data, the processor may receive the input from the requestor-computing device 102 over the computer network 112. The input may be representative of the prediction/identification of the one or more users in the one or more domains of interest. Further, the input may be representative of the first numerical value (number of users to be identified) and the second numerical value (the predefined level).

At step 304, the one or more messages are pre-processed. In an embodiment, the NLP 210 may be configured to pre-process the one or more messages of the user. Prior to pre-processing the one or more messages, the NLP 210 may receive or extract the one or more messages from the memory 204. The one or more messages may include the one or more written content, the one or more images, or the one or more recorded content. In an embodiment, the NLP 210 may be configured to extract a text content from a recorded content if the recorded content corresponds to an audio or video content. In an embodiment, the NLP 210 may utilize a speech-to-text converter to obtain the text content from the recorded content. Further, in an embodiment, the NLP 210 may be configured to utilize an optical character recognition (OCR) technique to extract the one or more written content (e.g., text) from an image.

In an embodiment, the NLP 210 may utilize one or more standard natural language processing techniques to preprocess the one or more messages. The pre-processing may include one or more predefined operations such as, but are not limited to, a tokenization or a stemming, of the one or more messages.

In an embodiment, the tokenization may correspond to a process of segmenting the one or more written content or the text content into one or more words, one or more phrases, one or more symbols, or other meaningful elements. In an embodiment, the tokenization may include removal of one or more characters such as punctuation marks. For example, a written content include "Friends, Romans, Countrymen, lend me your ears". In such a case, the tokenization of the written content may provide output such as "Friends Romans Countrymen lend me your ears".

In an embodiment, the stemming may correspond to a process of transforming a word to a root form. For example, if one or more words include words such as "finding", "find", and "finds". In such scenario, each of the one or more words is transformed to respective root form, "find".

Further, in an embodiment, the NLP 210 may be configured to translate the one or more messages from one or more human languages to a standard language. For example, the NLP 210 may translate the one or more messages that are in Spanish, Hindi, Chinese, or Japanese to English. Further, in an embodiment, the NLP 210 may be configured to separate one or more words in a message into individual morphemes. Further, in an embodiment, the NLP 210 may be configured to segment the one or more written content into one or more meaningful units such as words, sentences, or topics. In an embodiment, the NLP 210 may pre-process the one or more messages, as discussed above, to obtain the processed one or more messages. Hereinafter, the one or more messages may correspond to the processed one or more messages.

At step 306, one or more noisy data are eliminated from the one or more messages. The one or more noisy data may correspond to one or more words in a message or a set of messages from the one or more messages that may not be relevant to a task under consideration. For example, a requestor is searching for users who are interested in sports. In such a scenario, messages associated with a health or finance domain may not be useful. Therefore, the messages may correspond to noisy data. In an embodiment, the processor 202 may be configured to eliminate the one or more noisy data from the one or more messages. In an embodiment, the processor 202 may utilize a relevance detection algorithm to eliminate the one or more noisy data. The relevance detection algorithm may be modelled as a two class classification task, where a first class may correspond to relevant messages and a second class may correspond to non-relevant messages or vice-versa. With respect to ongoing example, the processor 202 identifies 3,000 messages for a user. Out of 3,000 messages, 1,000 messages were related to sports and the remaining 2,000 messages were not related to sports. In such a case, the processor 202 may include 1,000 messages in the first class and the remaining 2,000 messages in the second class. Further, the processor 202 may eliminate 2,000 messages from the dataset. Hereinafter, the one or more messages may correspond to the one or more noise free messages.

A person having ordinary skills in the art will understand that the two class classification task may be associated with a class imbalance problem. In such a case, the processor 202 may utilize one or more standard techniques, which may be known in the art, to categorize the one or more messages into one of the first class and the second class, without limiting the scope of the disclosure.

At step 308, each message, from the one or more messages, are transformed into a first message vector. In an embodiment, the first message vector of a message may be indicative of a binary representation of the message. The first message vector may be determined based on at least a comparison of one or more words in the message with a dictionary. In an embodiment, a word in the message may correspond to "1" in the first message vector if the word is present in the dictionary. Similarly, a word in the message may correspond to "0" in the first message vector if the word is not present in the dictionary. For example, a tweet posted by a user on TWITTER™ reads "match tomorrow, want to get a bat". The NLP 210 may process the tweet of the user. The processed tweet may correspond to as "match tomorrow want get bat". Thereafter, the processor 202 may determine a first message vector corresponding to the tweet. Let words, such as "match", "want", and "bat" are present in the dictionary, whereas the words, such as "tomorrow" and "get" are not present in the dictionary. In such a case, the first message vector of the tweet may be represented as follows:

first message vector: [match tomorrow want get bat]=[1 0 1 0 1]

Similarly, the processor 202 may be configured to determine the first message vector for each of the remaining one or more messages associated with the user. After determining the one or more first message vectors, the processor 202 proceeds to step 310 to categorize the one or more first message vectors into one or more categories.

At step 310, the one or more first message vectors are categorized into the one or more categories. In an embodiment, the processor 202 may be configured to categorize the one or more first message vectors into the one or more categories based on at least a predetermined class label associated with each of the one or more messages. For example, each of the one or more messages may include one or more keywords which may be representative of a class label. For example, a message displays "headache, sleeping". Based on at least a comparison with a dictionary, the processor 202 determines that the term "headache" is defined as pain in head. In such a case, the message may belong to a health domain. In another embodiment, the processor 202 may utilize the NLP 210 to identify the class of the message as discussed in step 304.

After categorizing the one or more first message vectors into the one or more categories, the processor 202 may be configured to perform the following processes, discussed in the steps 312-318, for each categorized first message vector in each category.

At step 312, the categorized first message vector is transformed into the one or more second message vectors. In an embodiment, the processor 202 may be configured to transform the categorized first message vector into the one or more second message vectors. In an embodiment, the processor 202 may utilize a wavelet packet transformation technique to determine the one or more second message vectors. In an embodiment, the processor 202 may perform 1-D wavelet packet transform on the categorized first message vector at the predefined level L to obtain the one or more second message vectors. In an embodiment, each predefined level may include at least the one or more second message vectors. In an embodiment, each of the one or more second message vectors may include one or more associated features. For example, one or more associated features may correspond to one or more words in a message. In an embodiment, each of the one or more associated features may be represented by one or more coefficients. The one or more coefficients may correspond to one or more numerical values corresponding to each of the one or more associated features that may be obtained after transforming the first message vector into the one or more second message vectors using the wavelet packet transformation technique.

In an embodiment, the predefined level L may be determined by utilizing various heuristic techniques such that an accuracy requirement may be met. Examples of the various heuristic techniques may include using a trial and error, a rule of thumb, an educated guess, an intuitive judgment, stereotyping, profiling, or common sense. In another embodiment, the requestor may provide the predefined level L. Further, in an embodiment, the processor 202 may be configured to determine a count of the one or more second message vectors based on at least the predefined level L. For example, the processor 202 may utilize a equation (e.g., $2*(2^L-1)$) to determine the count of the one or more second message vectors.

At step 314, a partial probability density is determined for each of the one or more coefficients. In an embodiment, the processor 202 may be configured to determine the partial probability density for each of the one or more coefficients. The one or more coefficients may be associated with the one or more second message vectors of the categorized first message vector. In an embodiment, the processor 202 may utilize the following equation to determine the partial probability density of a coefficient.

$$S_{m,f} = \frac{(x_{m,f})^2}{\Sigma(x_{i,f})^2} \quad (1)$$

where, $S_{m,f}$: Partial probability density of $m^{th}$ coefficient in $f^{th}$ second message vector; and $x_{m,f}$: $m^{th}$ coefficient in $f^{th}$ second message vector.

At step 316, a first score is determined for each of the one or more associated features. The first score may correspond to an average probability density function of a feature associated with a second message vector. In an embodiment, the processor 202 may be configured to determine the first score for each of the one or more associated features in the one or more second message vectors. In an embodiment, the processor 202 may determine the first score of the feature in the second message vector based on at least the partial probability distribution of the one or more coefficients associated with the feature in the second message vector. In an embodiment, the processor 202 may utilize the following equation to determine the average probability of the associated feature.

$$A_{m,f}^c = \frac{\sum S_{m,f}}{n_c} \quad (2)$$

where, $A_{m,f}^c$: Average probability of a feature m in a second message vector f for a category c; and $n_c$: Cardinality of the category c.

At step 318, a second score is determined for each of the one or more associated features in the one or more second message vectors. The second score of an associated feature in a second message vector may correspond to a discriminating power of the associated feature in the second message vector. In an embodiment, the discriminating power may be determined using Hellinger distance. In an embodiment, the processor 202 may be configured to determine the second score for the associated feature in the second message vector using the Hellinger distance. In an embodiment, the processor 202 may determine the second score $D_{l,m,f}^{a,b}$ of $m^{th}$ feature in $f^{th}$ second message vector located at level l between categories a and b using the Hellinger distance as follows:

$$D_{l,m,f}^{a,b} = \sqrt{\left(\sqrt{A_{l,m,f}^a} - \sqrt{A_{l,m,f}^b}\right)^2} \quad (3)$$

Similarly, the processor 202 may be configured to determine the second score for each of the one or more associated features in the one or more second message vectors. In an embodiment, the processor 202 may be configured to determine $C_2^k$ distances if the count of the one or more categories is equal to k.

At step 320, a predefined number of features, from the one or more associated features, are selected. In an embodiment, the processor 202 may be configured to select the predefined number of features from the one or more associated features based on at least the second score associated with each of the one or more associated features. Prior to selecting the predefined number of features, the processor 202 may rank the one or more associated features corresponding to each of the one or more second message vectors based on the second score associated with each of the one or more associated features. Thereafter, the processor 202 may select the predefined number of features based on at least the determined ranking. For example, the processor 202 may select top d features for each of the one or more first message vectors. Let a count of the one or more first message vectors is equal to p. In such a scenario, the processor 202 may generate a p*d data structure.

At step 322, the one or more classifiers are trained based on at least the selected predefined number of features. In an embodiment, the processor 202 may be configured to train the one or more classifiers based on at least the selected predefined number of features. For example, the processor 202 may train the one or more classifiers based on at least the generated data structure. The processor 202 may train the one or more classifiers using one or more machine learning techniques known in the art. Examples of one or more classifiers may include, but are not limited to, a Support Vector Machine (SVM), a Logistic Regression, a Bayesian Classifier, a Decision Tree Classifier, a Copula-based Classifier, a K-Nearest Neighbors (KNN) Classifier, or a Random Forest (RF) Classifier. In an embodiment, the one or more classifiers may categorize the user either in a positive category or a negative category. The positive category may be indicative of a fact that the user does have the one or more requirements. The negative category may be indicative of a fact that the user does not have the one or more requirements. Further, in an embodiment, the processor 202 may utilize the one or more classifiers to identify/predict the one or more requirements/needs of the user for the one or more resources.

After identifying/predicting the one or more requirements/needs of the user for the one or more resources, the requestor may utilize the requestor-computing device 102 to recommend the one or more resources (e.g., one or more products or services) pertaining to the one or more requirements of the user over the computer network 112. In an embodiment, the processor 202 may transmit the recommendation of the predicted one or more requirements for the one or more resources to the user-computing device (not shown) over the computer network 112.

A person having ordinary skills in the art will appreciate that the scope of the disclosure is not limited to the training of the set of classifiers, as discussed above. The set of classifiers may be trained using any machine learning or artificial intelligence technique known in the art without departing from the spirit of the disclosure.

Figure 4:
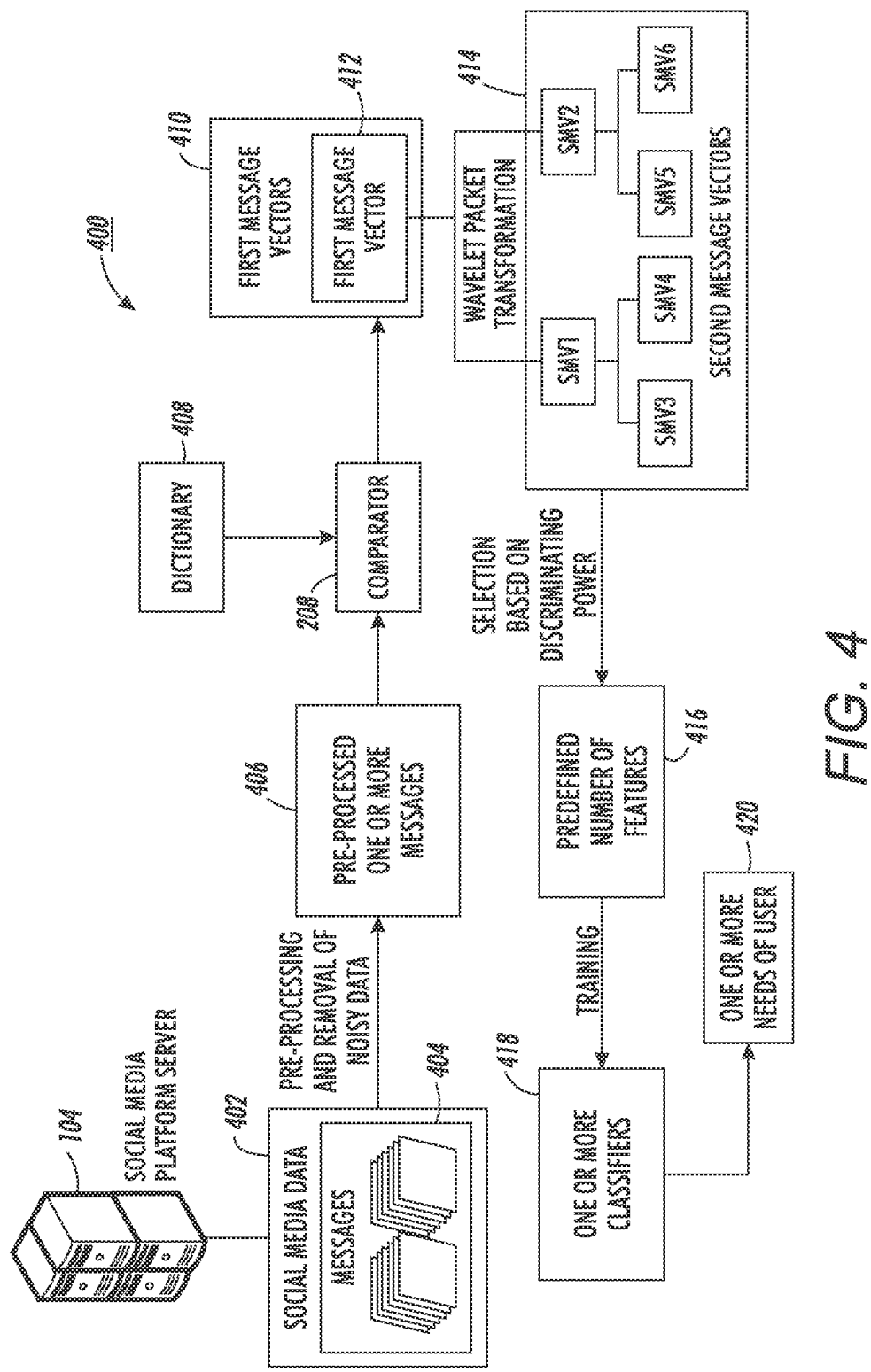
FIG. 4 is a flow diagram for predicting requirements of a user for one or more resources over a computer network, in accordance with at least one embodiment.

FIG. 4 is a flow diagram 400 illustrating an identification of one or more needs of a user for the one or more resources over the computer network 112, in accordance with at least one embodiment. The block diagram 400 is described in conjunction with FIG. 1, FIG. 2 and FIG. 3.

The social media data (denoted by 402) of the user is extracted either from the social media platform server 104 or the database server 108. The social media data includes one or more messages (denoted by 404) posted, shared, liked, or disliked by the user on the social network platforms such as FACEBOOK or TWITTER™. The one or more messages (denoted by 404) are pre-processed using the one or more standard natural processing techniques. Further, the one or more noisy data are eliminated from the one or more messages to obtain the pre-processed one or more messages (denoted by 406). Thereafter, the comparator 208 compares a presence of each of one or more words in the one or more pre-processed messages (denoted by 406) with a dictionary (denoted by 408). Based on at least the comparison, the processor 202 generates first message vectors (denoted by 410). For example, a first message vector is denoted by 412. Similarly, the processor 202 may generate the first message vector for each of the one or more processed messages.

Thereafter, for each of the first message vectors, the processor 202 determines one or more second message vectors (denoted by 414) by utilizing a wavelet packet transformation technique. For example, SMV1, SMV2, SMV3, SMV4, SMV5, and SMV6 are second message vectors corresponding to the first message vector (denoted by 412). Similarly, the processor 202 may determine the one or more second message vectors for each of the first message vectors (denoted by 410). Thereafter, the processor 202 may perform one or more statistical operations (e.g., determining partial probability distribution of each coefficient in the one or more second message vectors, average probability density of each associated feature, and discriminating power of each associated feature) on the one or more second message vectors. The processor 202 may select a predefined number of features (denoted by 416) from the one or more associated features based on at least the discriminating power associated with the one or more associated features. For example, the processor 202 selects SMV1 and SMV3. Let SMV1 and SMV2 are related to "zero processing fee" and "saving accounts," respectively. The selected predefined number of features is then utilized to train the one or more classifiers (denoted by 418). Further, the one or more classifiers may predict the one or more needs of the user (denoted by 420). For example, a need of a user may correspond to "opening a saving account in a bank with zero processing fee". In such a case, the requestor may recommend one or more banks, which facilitates opening of saving accounts with zero processing fee.

Figure 5:
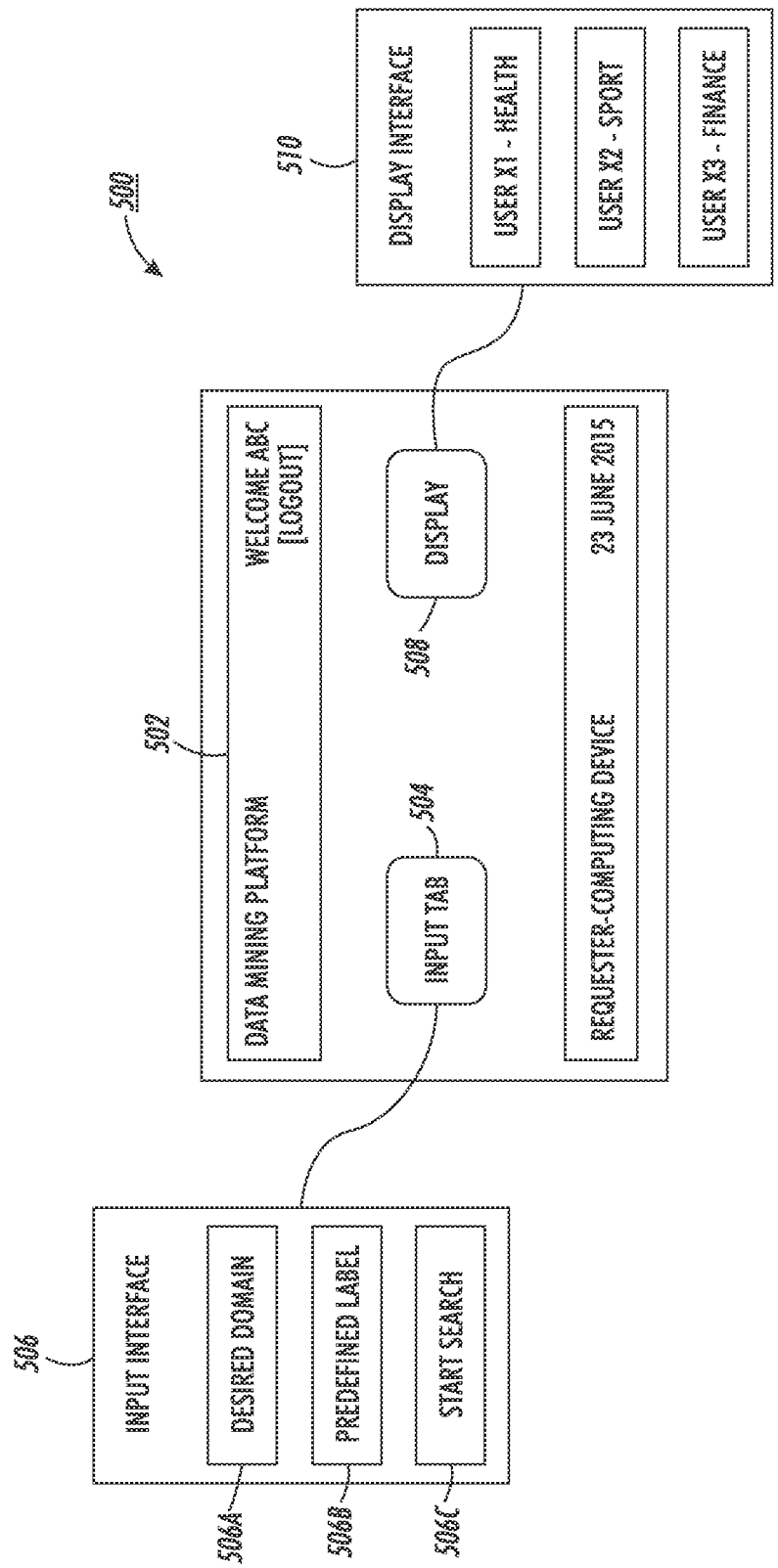
FIG. 5 is a block diagram illustrating an example graphical user-interface utilized by a requestor on a requestor-computing device, in accordance with at least one embodiment.

FIG. 5 is a block diagram illustrating an example GUI 500 that may be utilized by the requestor of the requestor-computing device 102 to provide the inputs pertaining to identification of the one or more needs of the user for the one or more resources, in accordance with at least one embodiment. The GUI 500 may be displayed on a display screen of a computing device such as the requestor-computing device 102. The requestor may log into a data mining platform 502 using his/her user ID and password. The processor 202 may then present the GUI 500 on the requestor-computing device 102, when the requestor may have logged in. The requestor may click on a tab such as an input tab 504 to provide information pertaining to the identification of the one or more needs of the user. After clicking on the input tab 504, the processor 202 may present an input interface 506 on the requestor-computing device 102. Further, the requestor may click on a tab, such as a desired domain tab 506A, to input one or more domains (e.g., a health domain, a finance domain, or a sport domain). Further, the requestor may click on a tab, such as a predefined level tab 506B, to input the predefined level (e.g., L=2). Further, the requestor may click on a tab, such as a start search tab 506C, to initiate the identification of the one or more needs of the one or more users.

After the identification/prediction of the one or more needs of the one or more users, the processor 202 may display a notification message that may display that the one or more needs of the one or more users have been identified. Thereafter, the requestor may click on a tab such as a display tab 508 to view the one or more needs of the one or more users. After clicking on the display tab 508, the processor 202 may present a display interface 510 on the requestor-computing device 102. The requestor may view the one or more needs of the one or more users on the display interface 510.

The disclosed embodiments encompass numerous advantages. The disclosure provides for an identification of one or more needs of a user. The disclosed methods and systems utilizes a user need mining algorithm to mine implicit needs of a user i.e. the needs which are not explicitly mentioned. The user need mining algorithm is based on at least an Improvised Adaptive Discriminant Wavelet Packet Transform (IADWPT) technique. The IADWAPT algorithm helps to pre-process the social media data faster, makes it less sparse and reduces dimensionality. The social media data is then subjected to the IADWPT algorithm which helps to identify the most relevant features which are required to perform user need mining. The disclosed method and system utilizes the most relevant features i.e. the discriminating features to identify the one or more needs of the user.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for predicting one or more requirements of a user for one or more resources have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for training one or more classifiers for predicting one or more user requirements for one or more resources over a computer network, the method comprising:
   generating, by one or more processors, a graphical user interface to be displayed on a computing device of a requestor, the graphical user interface including a plurality of tabs selectable by the requestor;
   receiving, by a transceiver and the one or more processors, one or more inputs provided by the requestor on the graphical user interface, the one or more inputs relating to a request for identifying the one or more user requirements for the one or more resources;
   upon receiving an input from the graphical user interface initiating the identification, retrieving, by the one or more processors from one or more social medial platform servers one or more audio, video, image, or text messages posted by a user on one or more social media websites;
   transforming, by the one or more processors, each message of the one or more messages into a first message vector based on at least a comparison with a dictionary;
   categorizing, by the one or more processors, each of one or more first message vectors into categories based on a predetermined class label associated with respective message;
   for each categorized first message vector in a category from the categories:
      transforming, by the one or more processors, the categorized first message vector into a plurality of second message vectors using a wavelet transform technique, wherein each second message vector of the plurality of second message vectors has associated features, and wherein each of the associated features is represented by one or more coefficients;
      determining, by the one or more processors, a probability distribution of each of the one or more coefficients;
      determining, by the one or more processors, a first score, for each associated feature, based on at least the probability distribution of each of the one or more coefficients associated with the each associated feature;
      determining, by the one or more processors, a second score for a first associated feature based on the first score of the first associated feature in the category and the first score of a second associated feature in another category; and
      selecting, by the one or more processors, a predefined number of features, from the associated features, based on at least the second score; and
   training, by the one or more processors, one or more classifiers on the selected predefined number of features, wherein the one or more classifiers categorize the user as having one or more requirements, the one or more classifiers predict the one or more user requirements for the one or more resources based on the categorization.

2. The method of claim 1, wherein the one or more resources correspond to one or more of one or more products and one or more services associated with one or more domains, and wherein the one or more domains include one or more of a health domain, a finance domain, an education domain, and a job domain.

3. The method of claim 1 further comprising pre-processing, by the one or more processors, the one or more messages using one or more natural language processing techniques, wherein the pre-processing comprises at least one of a tokenization, a stemming, or a normalization of the one or more messages.

4. The method of claim 1 further comprising eliminating, by the one or more processors, a noisy data from the one or more messages by utilizing a relevance detection technique.

5. The method of claim 1, wherein selecting the predefined number of features based on at least the second score comprises:
ranking, by the one or more processors, the one or more associated features corresponding to each of the one or more second message vectors based on at least the second score.

6. The method of claim 5, wherein the predefined number of features is selected based on the ranking.

7. The method of claim 1, wherein the one or more classifiers are trained based on one or more machine learning techniques comprising at least one of a Support Vector Machine (SVM), a Logistic Regression, a Bayesian Classifier, a Decision Tree Classifier, or a Copula-based Classifier, a K-Nearest Neighbors (KNN) Classifier, or a Random Forest (RF) Classifier.

8. A system for training one or more classifiers for predicting one or more user requirements for one or more resources over a computer network, the system comprising:
a transceiver configured to transmit and receive data from a computing device of a requestor;
one or more processors configured to:
generate a graphical user interface to be displayed on a computing device of a requestor, the graphical user interface including a plurality of tabs selectable by the requestor;
receive, through the transceiver, one or more inputs provided by the requestor on the graphical user interface, the one or more inputs relating to a request for identifying the one or more user requirements for the one or more resources;
upon receiving an input from the graphical user interface initiating the identification, retrieve, from one or more social medial platform servers, by the one or more processors, one or more audio, video, image, or text messages posted by a user on one or more social media websites;
transform each message of the one or more messages into a first message vector based on at least a comparison with a dictionary;
categorize each of one or more first message vectors into categories based on a predetermined class label associated with respective message;
for each categorized first message vector in a category from the categories:
transform the categorized first message vector into a plurality of second message vectors using a wavelet transform technique, wherein each second message vector of the plurality of second message vectors has associated features, and wherein each of the associated features is represented by one or more coefficients;
determine a probability distribution of each of the one or more coefficients;
determine a first score, for each associated feature, based on at least the probability distribution of each of the one or more coefficients associated with the each associated feature;
determine a second score for a first associated feature based on the first score of the first associated feature in the category and the first score of a second associated feature in another category; and
select a predefined number of features, from the associated features, based on at least the second score; and
train one or more classifiers on the selected predefined number of features, wherein the one or more classifiers categorize the user as having one or more requirements, the one or more classifiers predict the one or more user requirements for the one or more resources based on the categorization.

9. The system of claim 8, wherein the one or more processors are further configured to pre-process the one or more messages using one or more natural language processing techniques, wherein the pre-processing comprises at least one of a tokenization, a stemming, or a normalization of the one or more messages.

10. The system of claim 8, wherein the one or more processors are further configured to eliminate a noisy data from the one or more messages by utilizing a relevance detection technique.

11. The system of claim 8, wherein selecting the predefined number of features based on at least the second score comprises:
ranking the one or more associated features corresponding to each of the one or more second message vectors based on at least the second score.

12. The system of claim 11, wherein the predefined number of features is selected based on the ranking.

13. The system of claim 8, wherein the one or more classifiers are trained based on one or more machine learning techniques comprising at least one of a Support Vector Machine (SVM), a Logistic Regression, a Bayesian Classifier, a Decision Tree Classifier, or a Copula-based Classifier, a K-Nearest Neighbors (KNN) Classifier, or a Random Forest (RF) Classifier.

14. A computer program product for use with a computer, the computer program product comprising a non-transitory computer readable medium, wherein the non-transitory computer readable medium stores a computer program code executable by a processor to cause the processor to perform a method for training one or more classifiers for predicting one or more user requirements for one or more resources over a computer network, the method comprising:
generating a graphical user interface to be displayed on a computing device of a requestor, the graphical user interface including a plurality of tabs selectable by the requestor;
receiving one or more inputs provided by the requestor on the graphical user interface, the one or more inputs relating to a request for identifying the one or more user requirements for the one or more resources;
upon receiving an input from the graphical user interface initiating the identification, retrieving, from one or more social medial platform servers, one or more audio, video, image, or text messages posted by a user on one or more social media websites;
transforming each message of the one or more messages into a first message vector based on at least a comparison with a dictionary;
categorizing each of one or more first message vectors into categories based on a predetermined class label associated with respective message;
for each categorized first message vector in a category from the categories:

transforming the categorized first message vector into a plurality of second message vectors using a wavelet transform technique, wherein each second message vector of the plurality of second message vectors has associated features, and wherein each of the associated features is represented by one or more coefficients;

determining a probability distribution of each of the one or more coefficients;

determining a first score, for each associated, feature based on at least the probability distribution of each of the one or more coefficients associated with the each associated feature;

determining a second score for a first associated feature based on the first score of the first associated feature in the category and the first score of a second associated feature in another category; and selecting a predefined number of features, from the associated features, based on at least the second score; and training one or more classifiers on the selected predefined number of features, wherein the one or more classifiers categorize the user as having one or more requirements, the one or more classifiers predict the one or more user requirements for the one or more resources based on the categorization.

* * * * *